Dec. 19, 1950     F. E. KLING     2,534,977
SWINGING HOT SAW
Filed April 26, 1946     3 Sheets-Sheet 1

Inventor.
Fred E. Kling.
By Amory ?roff
Attorney

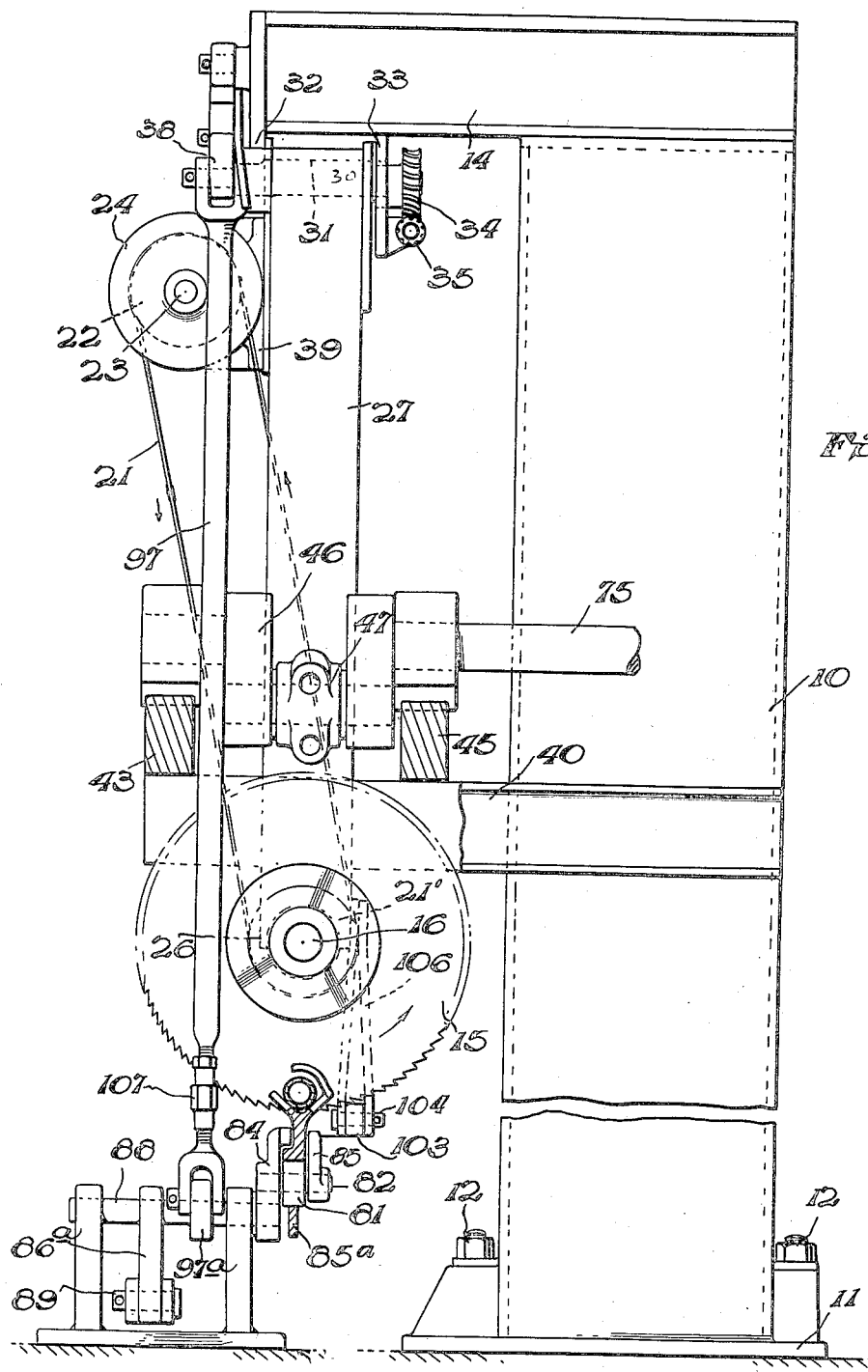

Dec. 19, 1950     F. E. KLING     2,534,977
SWINGING HOT SAW
Filed April 26, 1946     3 Sheets-Sheet 3
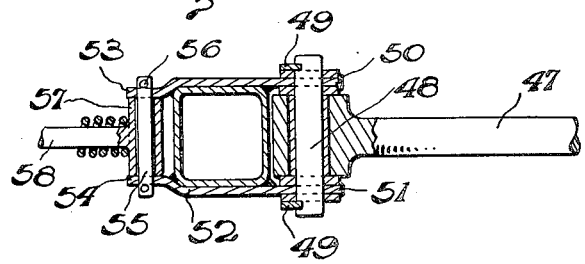
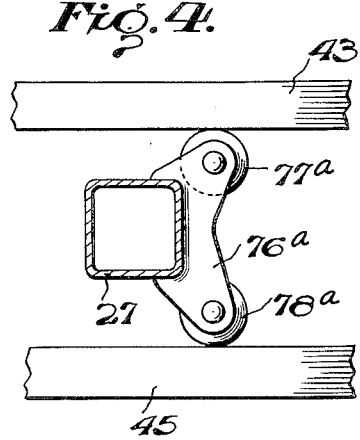
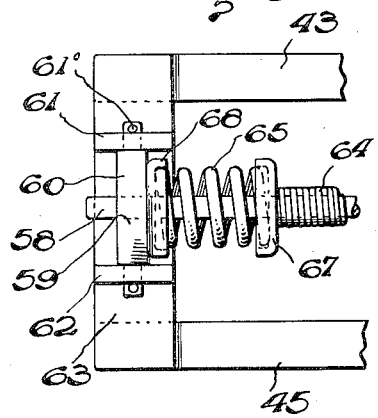
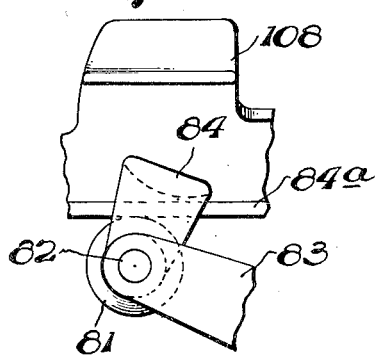
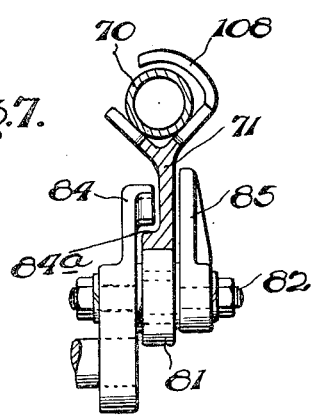

Patented Dec. 19, 1950

2,534,977

UNITED STATES PATENT OFFICE 2,534,977

SWINGING HOT SAW

Fred E. Kling, Youngstown, Ohio

Application April 26, 1946, Serial No. 665,161

8 Claims. (Cl. 29—69)

This invention relates to apparatus for severing moving material and more particularly to a novel swinging severing tool arranged for severing continuously moving stock, such as rods, tubing or the like into desired lengths.

Heretofore, apparatus for severing tubular stock continuously being fed from a tube mill have at their best been able to sever pipe accurately only up to 500 feet per minute, wherein the pipe may be as large as 4" or more in diameter. It is desirable, however, to cut smaller pipe at much higher speed so as to increase the mill output, there being a large demand for small pipe for house plumbing. Usually such severing devices are parallel moving disc saws, which are tilted down and up toward the pipe to be cut at right angles to the axis of the same by some power means, while the cutting disc or saw is rotated by an electric motor mounted on part of the moving saw carriage. As this motor represents one of the heaviest parts of the apparatus, it requires considerable energy or power to rapidly move the saw carriage on which it is mounted into tube cutting positions.

Accordingly, one object of the present invention is to reduce the weight of the moving parts and to shorten their travel by using a pendulum instead of a carriage for mounting the saw and operating mechanism. It is thus possible, for instance, to locate the saw rotating motor near the pivot of the pendulum, whereby the travel of same is reduced to one-eighth of what it would be if mounted on the saw arbor. As the work required to accelerate mass increases with the square of the velocity, the force to accelerate the motor is only one sixty-fourth that necessary if the motor were at the axis of the saw.

Another object is to provide novel improvements in swing saws for cutting continuously moving stocks into lengths, by materially reducing the equivalent mass at the lower edge of the saw, whereby the saw motion can be fast enough to sever pipe into predetermined lengths when the same is moving as fast as 1,000 feet per minute.

A further object is to provide in combination with a novely mounted swing saw, a novel feed arrangement, whereby the stock to be severed is moved up toward the saw intermittently and in synchronism with the swing of the saw, as the stock is fed forward under the saw from the mill.

A still further object is to pendulously mount the saw, so that the broad side of the saw swing in line with the axis of the stock to be severed instead of at right angles to the axis of the stock, thereby moving the saw in line with the pipe to be cut and at the same speed.

Additional objects are to provide for vertical adjustment of the pendulously mounted saw to compensate for wear of the saw blade, and to also provide resilient means adapted to assist in the acceleration of the moving masses of the apparatus.

The above and further objects and novel features of the present invention will more fully appear from the following detailed description when the same is read in connection with the accompanying drawings. It is to be expressly understood, however, that the drawings are for purposes of illustrating a preferred form only and are not intended as a definition of the limits of the invention.

In the drawings, wherein like reference characters refer to like parts throughout the several views:

Figure 2 is an end view partly in cross section of the apparatus looking at the broad side of the saw and along the axis of the pipe or the like to be severed;

Figure 3 is a cross section view taken along the line 3—3 of Figure 1;

Figure 4 is a cross section view taken along the line 4—4 of Figure 1;

Figure 5 is a top plan view of one end of the saw oscillating mechanism and its mass accelerating springs;

Figure 6 is a detail view in side elevation of one connection to the stock feeding trough; and Figure 7 is a vertical section view taken through the stock guiding trough with its actuating levers, in elevation.

Figure 1:
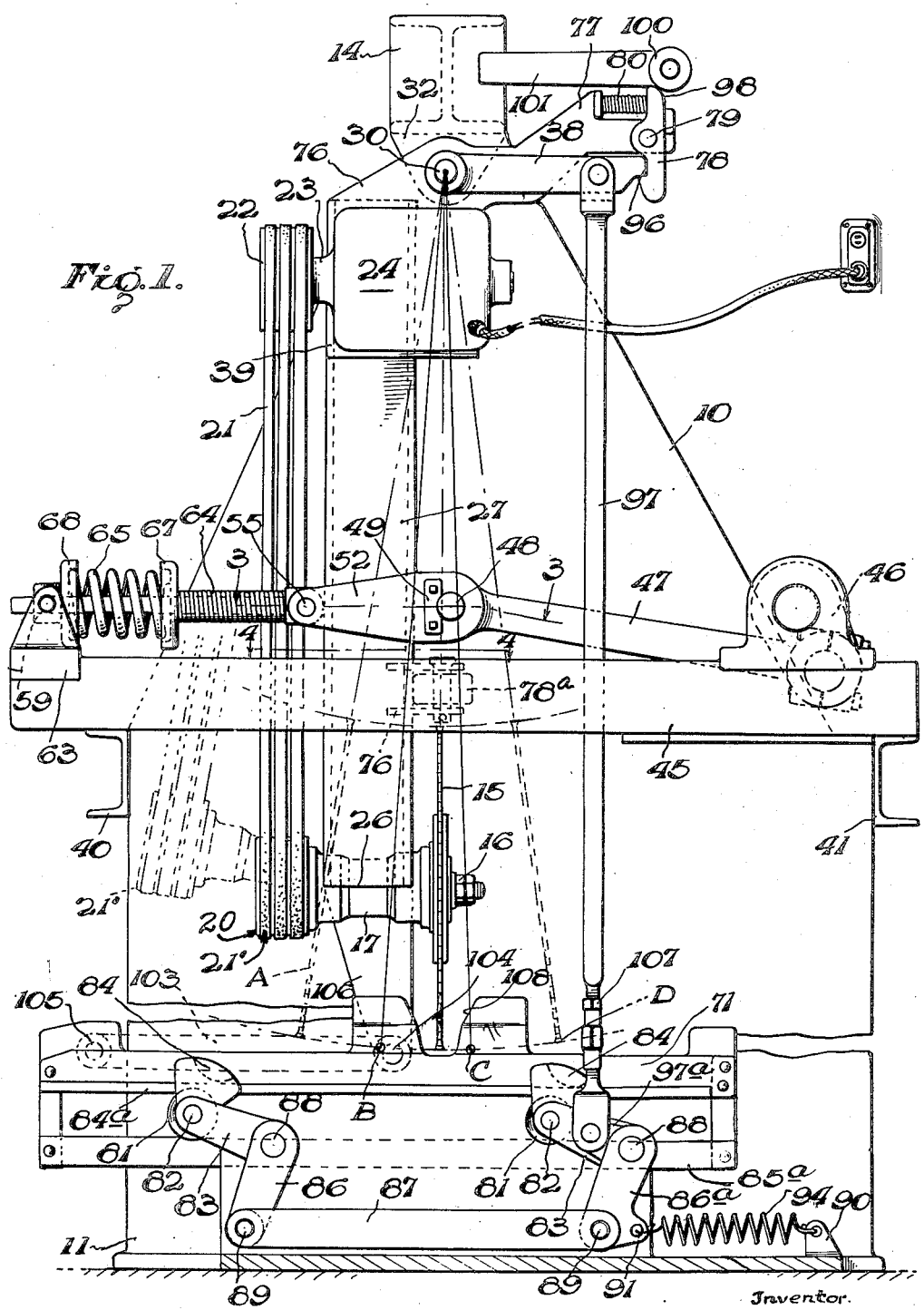
Figure 1 is a side view of the apparatus looking at the cutting edge of the saw.

Referring to the drawings in detail, and first with reference to Figures 1 and 2, the apparatus comprises a supporting frame 10 having a base 11 secured to the floor by suitable means, such, for example, as bolts 12. Extending from the top of the frame 10 is an overhanging beam 14, which serves as a support for a pendulously mounted saw 15.

The saw 15 is mounted on an arbor 16, which in turn is mounted in a bearing housing 17. On the opposite end of the arbor 16 is secured a belt pulley 20 from around which is stretched a drive belt 21. This drive belt loops around a companion pulley 22 secured to the end of a rotor shaft 23 projecting from the housing of an electric motor 24. The bearing housing 17 is secured as by welding to the lower end 26 of a pendulously pivoted stem or arm 27, the upper end of which is transversely bored to provide aligned openings for a pivot pin 30.

The pivot pin 30 has an eccentric outer portion 31 (Figure 2), on which the arm 27 turns, and extends through depending lugs 32 and 33 on the underside of the beam 14. This pin 30 extends beyond lug 33 and has a worm gear 34 keyed to the end thereof, which gear is in mesh with a worm shaft 35 turned when desired by a hand crank, not shown, so as to provide a vertical adjustment for the pendulum arm 27 and thus compensate for wear of the saw blade 15. For example, such adjustment may be sufficient to allow for wear from a 22" to a 20" diameter of the saw. The opposite end of the pin 30 projects beyond the lug 32 and rotatably mounts a latch lever 38, hereinafter to be described.

The motor 24 is secured to the top end of the pendulum arm 27 adjacent but below the pivot pin 30 by means of a motor base plate 39. This plate may be secured to the arm 27 by any suitable means, not shown, and as the motor 24 is placed directly below the pin 30 the extent of movement of the motor is very slight and requires very little power to move.

The saw 15 and the pendulum arm 27 at the lower end swing between two spaced substantially parallel members, such as the channel iron beams 40 and 41. The beams 40 and 41 may be welded or riveted to the frame 10, see Figures 1 and 2. Bridged over and mounted on the top edges of the beams 40 and 41, respectively, are girders or bars 43 and 45. These girders are spaced apart, so as to mount between them at one end a power driven crank shaft 46 and connecting rod 47 for oscillating the saw 15 from positions A to D, see Figure 1. The other end of the connecting rod is pivoted on a pin 48 locked by keys 49 in the apertured side plates 50 and 51, of a bracket 52, see Figure 3. The bracket 52 extends into apertured ears 53 and 54 on the opposite side of the pendulum arm 27 from its connecting rod connection, and a transverse pin 55 is retained therein by cotter pins 56.

Around the pin 55 is pivotally journalled a sleeve 57, which is integrally formed on the end of a shaft 58, which shaft at its other end slides through an opening 59 in a cross head 60 (Fig. 5). The cross head 60 in turn is pivotally mounted between upstanding lugs 61 and 62 extending upwardly from the top of a bar 63, which bridges the ends of the girders 43 and 45.

Around the rod 58 are coiled two different sizes of springs 64 and 65, respectively. The smaller and weakest spring 64 has one end seated against the sleeve 57 and the other seated against the flat side of a cup-shaped floating washer 67. Against the opposite cupped side of the washer 67 is seated one end of the larger and stronger spring 65, while the other end of the spring 65 is seated against the cupped side of a similar washer 68 on the sliding end of the shaft 58 next to the cross head 60.

When the saw 15 is at rest or in starting position A, shown in Figure 1, both springs are compressed. As soon as the saw starts to move, spring 65 expands, assisting to accelerate the moving masses. When the saw 15 has reached a point B where it begins to cut the pipe 70 in the feed trough 71 about to be described, then spring 65 has expanded almost fully and no further acceleration is required. After the saw has moved through point C to point D, then spring 64 expands completely and also the spring 65. Then, on the return stroke, spring 64, being the weakest, is compressed first, and then spring 65 assists in decelerating the moving masses, storing up energy and relieving the load on the brake (not shown) which is part of a conventional driving mechanism (not shown) connected to shaft 75. (Figure 2.) Preferably, the spring 64 is about one-sixth as strong as spring 65, to thus provide for a gradual load up of the latter, as otherwise there would be a hammering or chattering noise produced when the pendulum arm 27 swings against the tension of spring 64.

The pendulum arm 27 at a level on its length adjacent to the inner faces of girders 43 and 45 extending to each side, has mounted thereon a bracket 76a with guide rollers 77a and 78a in each end which roll along the inner faces of the girders as shown in Figure 4.

The trough 71 is adapted to be raised and lowered to and from the saw 15. Lifting of the trough 71 on vertical motion is accomplished by the mechanism at the top of the pendulum arm 27. For example, as the saw 15 is oscillated between positions A to D, it imparts the vertical motion to the feeding trough 71 from a pivot plate 76 secured to arm 27, which plate, with arm 27, is freely turnable on pivot pin 31. The plate 76 has an arm 77, shown in Figure 1, to which is pivoted a latch 78 on a pin 79, which latch is normally held in engagement with the lever 38 by a spring 80.

The trough 71 rests on rollers 81, which revolve freely on axle pins 82. The pins 82 are fastened to levers 83 having lugs 84, which engage with a ledge 84a on the trough 71. In addition, pins 82 project through the rollers 81 and lever 83 and have mounted thereon lugs 85, while below the trough is a bar 85a, which parts steady the movements of trough 71. The levers 83 work efficiently in unison as they are pivotally connected by levers 86 and 86a, and link 87 mounted on shafts 88 and thus assure keeping the trough horizontal. Link 87 pivots on pins 89 at each end mounted in the ends of levers 86 and 86a. Also, connected to a lug 90 on base 11 and a lug 91 on lever 86a, is a tension spring 94. The spring 94 tends to produce a quick downward movement of the trough after the pipe has been severed. In operation the trough 71 must perform two motions simultaneously; one is parallel with the direction of motion of the pipe or the like to be served and the other motion is vertical. The first motion is simply accomplished by means of a link 103, one end of which is pivoted on a stud 104 to a bracket 106 secured to the pendulum arm 27 and the other end of which is pivoted to the trough 71 by a stud 105, see Figure 1.

The trough 71 is lifted vertically by latch 78 pivoted on arm 77 of the pivot plate 76, which engages under the nose 96 of lever 38 as the pendulum arm 27 oscillates. The lever 38 is connected to the trough by means of a rod 97 pivoted to a lever 97a keyed to shaft 88. The rod 97 on the lower end is provided with an adjustable section, such as a turnbuckle 107, for regulating the vertical movements of the trough 71, if desired.

The latch 78 on the upper end 98 is beveled and this latch stays engaged as the arm 77 of the pivot plate 76 swings until the beveled end 98 engages a roller 100 carried by an arm or bar 101 suitably secured to the beam 14, as by welding, riveting, or the like. Thus, when the end 98 comes in contact in its upward movement with the roller 100, the latch 78 is released from engagement with lever 38, permitting the latter to drop and in turn the trough 71. This is arranged to occur at position C (Fig. 1), at which position the pipe 70 is cut.

The trough 71 includes a saw guard 108 (Fig. 1) between which the lower edge of the saw 15 revolves during the motions of the trough.

From the foregoing it will be seen that there is provided a novel swinging hot saw for cutting continuously moving tubular stock from a tube mill, which can cut the stock in accurate measured lengths while feeding the stock at a rate of 1,000 feet per minute, the parts of the apparatus being so arranged and mounted as to require but a minimum amount of energy to impart motion to the same, and the saw being mounted to swing in line with the axis of the stock being fed past the saw by the feeding mechanism.

While the operation and coordination of parts has been described as required to set forth a complete understanding of the invention, nevertheless, the general sequence of operations may be briefly described as follows:

Pipe to be cut is continuously being fed from the mill along the trough 71, which from positions A to C is held elevated so that the cutting edge of the saw 15 will cut the pipe at position C. For example, the saw 15 is in starting position at point A, as shown in Figure 1. When in this position the pivot plate arm 77 is down from the latch trip roller 100 and out of contact with the beveled end 98 of the latch 78 and the trough is elevated. As the saw 15 and pendulum arm 27 are moved by connecting the rod 47 from starting position A, the arm 77 rocks upward, until the beveled end 98 of the latch 78 comes in contact with the trip roller 100, and releases the hooked end of the latch 78 from under lever 38 permitting the trough 71 to drop vertically until the return swing of the pendulum arm 27, arm 77 and latch 78 again vertically raise the trough by rod 97 to the cutting edge of the saw.

The drop of the trough occurs at position C, at which point the pipe is cut, and the space from C to D is required to decelerate the saw.

On the return swing of the saw 15, the trough slides along rollers 81 because of the link 103 connected to bracket 106 mounted on the pendulum arm 27 and to the rear of the trough. When the new cutting cycle begins the link 103 pulls the trough forward with the pipe to be severed therein for a predetermined distance, until the saw again arrives at its cutting position B. Because of the slight extent of the saw movement, these movements of the trough are very rapid, and accordingly, means are provided to steady the trough and aid the return movements thereof as previously explained.

Without further description it is thought that the operation and advantages of the invention will be apparent, and also that modifications occurring to those skilled in the art may be resorted to within the scope of the appended claims.

I claim:

1. A swinging saw for cutting material being continuously fed from a source of supply into predetermined lengths, comprising a pendulous member pivoted to the top of a frame, said frame including a beam having a pair of lugs with openings therein, a pivot pin eccentrically mounted in the said lug openings, said pin having an extended end beyond one side of one lug, means carried by this lug adapted to turn said pin in the lug openings to vary the eccentric adjustment of the pin, an arbor mounted on the free end of said pendulous member, a disc saw rotatably journalled on the arbor, a motor having a rotor shaft mounted on the pendulous member adjacent the pivotal connection thereof in the frame, cooperating drive and driven members keyed to the rotor shaft and said arbor, respectively, and power means connected to said pendulous member to swing the broad side of said saw in a plane substantially parallel to the line of travel of said continuously fed material to be severed.

2. A swinging saw for cutting material being continuously fed from a source of supply into predetermined lengths, comprising a pendulous member pivoted to the top of a frame, said frame including a beam, spaced apertured lugs secured to said beam, an axle pin eccentrically mounted in said lugs and extending beyond one of said lugs at one end, a gear on said extended end of the pin, a worm gear in mesh with said first gear, means for turning said axle pin through said gears to vary the position of the said eccentric axle pin, an arbor mounted on the free end of said pendulous member, a disc saw rotatably journalled on the arbor, a motor having a rotor shaft mounted on the pendulous member adjacent the pivotal connection thereof in the frame, cooperating drive and driven members keyed to the rotor shaft and said arbor, respectively, and power means connected to said pendulous member to thereby swing the broad side of said saw in a plane substantially parallel to the line of travel of said continuously fed material to be severed.

3. In a system for cutting continuously moving elongated rods or the like into predetermined lengths, a main frame having a top supporting beam, a pair of spaced apertured lugs on said beam, a pin mounted in said lugs, a pendulous member pivoted on said pin, an arbor mounted on the free end of said pendulous member, a disc saw rotatably mounted on the arbor, a motor mounted on said pendulous member, said motor being adjacent the pivotal connection thereof in the said beam, cooperating pulleys keyed on the motor shaft and said arbor to thereby rotatably drive the saw, means connected to said pendulous member to swing the broad side of the saw in a plane parallel with the rods or like material being fed to be severed, and feed means movably mounted with respect to the main frame below the saw thereby guiding rods or the like to be severed forward laterally into contact with the cutting edge of the saw.

4. In a system for cutting continuously moving rods or the like into predetermined lengths, a main frame having a top supporting beam, spaced parallel lugs on each side of said beam with aligned openings, a pin mounted in said openings, a pendulous member pivoted on said pin, an arbor mounted on the free end of said pendulous member, a disc saw rotatably mounted on the arbor, a motor mounted on said pendulous member adjacent the pivotal connection thereof in the said beam, cooperating pulleys keyed on the motor shaft and said arbor to thereby rotatably drive the saw, means connected to said pendulous member to swing the broad side of the saw in a plane parallel with the axis of the rods or like material being fed to be severed, feed means movably mounted with respect to the main frame below the saw adapted to guide lengths of rods or the like to be severed laterally into the saw and intermittently downward out of the range of the cutting edge of the saw, and means connecting the said pendulous member to said feed means adapted to impart said horizontal forward and intermittent downward movements of said feed means in synchronism with the swing of the pendulous member for cutting predetermined lengths of the continuously moving rods or the like.

5. In a system for cutting continuously moving rods or the like into predetermined lengths, a main frame having a top supporting beam, a pair of spaced apertured lugs on said beam, a pin mounted in said lugs, a pendulous member pivoted on said pin, an arbor mounted on the free end of said pendulous member, a disc saw rotatably mounted on the arbor, a motor mounted on said pendulous member adjacent the pivotal connection therof in the said beam, cooperating pulleys keyed on the motor shaft and said arbor to thereby rotatably drive the saw, means connected to said pendulous member to thereby swing the broad side of the saw in line with the rods or like material being fed to be severed, feed means movably mounted with respect to the main frame below the saw adapted to guide lengths of rods or the like toe be severed laterally into contact with the cutting edge of the saw for cutting the same, said feed means including a trough having the rear end thereof connected by a link member to the free end of said pendulous member, to thereby provide horizontal movement to the trough in coordination with the swing of the pendulous member and the saw to pipe cutting position, and means connected to the top of said pendulous member adapted to hold said trough elevated to the pipe cutting position and to drop the trough at the pipe cutting position.

6. In a system for cutting continuously moving rods or the like into predetermined lengths, a main frame having a top supporting beam, spaced parallel lugs on each side of said beam with aligned openings, a pin mounted in said openings, a pendulous member pivoted on said pin, an arbor mounted on the free end of said pendulous member, a disc saw rotatably mounted on the arbor, a motor mounted on said pendulous member adjacent the pivotal connection thereof in the said beam, cooperating pulleys keyed on the motor shaft and said arbor to thereby rotatably drive the saw, means connected to said pendulous member to swing the broad side of the saw in a plane parallel with the rods or like material being fed to be severed, guide means movably mounted with respect to the main frame below the saw adapted to feed lengths of rods or the like to be severed laterally into the saw and intermittently downward out of the range of the cutting edge of the saw, and means connecting the said pendulous member to said feed means adapted to impart said lateral and intermittent downward movements of said feed means in synchronism with the swing of the pendulous member for cutting predetermined lengths of the continuously moving rods or the like, said last named means comprising an arm secured to said pendulous member, a latch pivoted to the end of the arm, a second arm freely pivoted on an end of said above-mentioned pin having a reduced nose portion engageable by said latch, spring means adapted to normally hold said latch engaged under said nose portion, said latch having its free end beveled, latch release means mounted on said beam above said beveled end for intermittent contact therewith, and a rod pivoted at one end to said second arm near its nose portion and to link members connected to said trough at the other end, whereby when said pendulous member and saw move from starting position to cutting position said latch releases said second arm and said trough drops vertically by gravity and spring action when pipe is severed.

7. The apparatus as described in claim 6, wherein the rod connected between said second arm and said trough link members is adjustable to vary its length, whereby the vertical movement of said trough may be regulated.

8. In a system for cutting continuously moving rods or the like into predetermined lengths, a main frame having a top supporting beam, a pair of spaced apertured lugs on said beam, a pin mounted in said lugs, a pendulous member pivoted on said pin, an arbor mounted on the free end of said pendulous member, a disc saw rotatably mounted on the arbor, a motor mounted on said pendulous member adjacent the pivotal connection thereof in the said beam, cooperating pulleys keyed on the motor shaft and said arbor to thereby rotatably drive the saw, means connected to said pendulous member to swing the broad side of the saw in a plane parallel to the axis of the rods or like material being fed to be severed, and guide means movably mounted below the saw adapted to feed lengths of rods or the like to be severed laterally into the saw into contact with the cutting edge of the saw for cutting the same, said guide means comprising a trough adapted to be moved horizontally to pipe cutting position and vertically to non-cutting position, said trough having along its lower edge, a support for said trough including rollers, said roller being mounted to revolve freely on pins, said pins having extended ends, levers connected to said extended ends of the pins, lugs also mounted on said pins engaged over the said ledge for holding said trough in constant engagement with said rollers carried by said levers, a toggle connection adapted to maintain the trough in a level horizontal plane, an adjustable rod connected to said toggle connection, an arm freely pivoted on said pendulous member's pivot pin, a latch for holding said arm, release means for said latch responsive to the swing of said saw for cutting position, whereby said latch releases said arm after the pipe is severed, and said arm and rod permit the trough to drop vertically with the rod material.

FRED E. KLING.

REFERENCES CITED

The following references are of record in the file of this patent:

UNITED STATES PATENTS

| Number | Name | Date |
|---|---|---|
| 558,646 | Hardie | Apr. 21, 1896 |
| 1,283,922 | Rowell | Nov. 5, 1918 |
| 1,606,308 | Lund | Nov. 9, 1926 |
| 1,994,718 | Rafter | Jan. 23, 1934 |
| 2,332,013 | Rudert et al. | Oct. 19, 1943 |
| 2,341,870 | Johnston | Feb. 15, 1944 |
| 2,374,806 | Cicchetti et al. | May 1, 1945 |
| 2,452,343 | Wilson | Oct. 26, 1948 |

FOREIGN PATENTS

| Number | Country | Date |
|---|---|---|
| 471,104 | Great Britain | Aug. 23, 1937 |